United States Patent
Fay, III et al.

[11] Patent Number: 6,040,266
[45] Date of Patent: Mar. 21, 2000

[54] FOAM CATALYST SUPPORT FOR EXHAUST PURIFICATION

[75] Inventors: Thomas F. Fay, III, Fair Oaks; Raffaele La Ferla, Hermosa Beach; Andrew J. Sherman, Granada Hills; Edwin P. Stankiewicz, Sherman Oaks, all of Calif.

[73] Assignee: Ultramet, Pacoima, Calif.

[21] Appl. No.: 08/199,684

[22] Filed: Feb. 22, 1994

[51] Int. Cl.[7] .............................. B01J 21/04; B01J 21/18
[52] U.S. Cl. .................... 502/439; 502/177; 502/178; 502/182; 502/200; 502/527; 423/445 R; 423/447.4
[58] Field of Search ..................... 502/439, 527, 502/177, 200, 178, 182; 423/445 R, 447.4

[56] References Cited

U.S. PATENT DOCUMENTS

| | | | |
|---|---|---|---|
| 3,446,593 | 5/1969 | Moutaud | 423/448 |
| 3,927,186 | 12/1975 | Vinton et al. | 423/447 |
| 4,022,875 | 5/1977 | Vinton et al. | 423/445 |
| 4,024,226 | 5/1977 | Lersmacher et al. | 423/449 |
| 4,154,704 | 5/1979 | Vinton et al. | 264/29.1 |
| 4,215,161 | 7/1980 | Seibold et al. | 427/389.8 |
| 4,609,972 | 9/1986 | Edeling et al. | 423/445 |
| 4,777,152 | 10/1988 | Tsukada | 423/345 |
| 4,806,290 | 2/1989 | Hopper et al. | 502/182 |
| 4,812,434 | 3/1989 | Pohlmann et al. | 502/178 |
| 5,093,289 | 3/1992 | Braetsch et al. | 501/80 |
| 5,154,970 | 10/1992 | Kaplan et al. | 428/408 |
| 5,372,380 | 12/1994 | Duffy et al. | 280/740 |

*Primary Examiner*—Walter D. Griffin
*Assistant Examiner*—In Suk Bullock
*Attorney, Agent, or Firm*—Bruce A. Jagger

[57] ABSTRACT

A method of producing an acoustic baffle/catalyst foam support material and the resultant material. A polyurethane open cell foam material is provided having a density between 10–100 ppi. The polyurethane foam is infiltrated with a resin material to produce an impregnated foam. The impregnated foam is pyrolized to form a carbon skeleton forming a carbon foam. The carbon foam skeleton is coated with one or more of the following group of materials to a relative density of five to thirty five (5–35) percent, the group of materials being SiC, $Si_3N_4$, $MoSi_2$ or high temperature metal.

29 Claims, 5 Drawing Sheets

FOAM CATALYST SUPPORT FOR EXHAUST PURIFICATION

BACKGROUND OF THE INVENTION

Recent EPA mandates are now placing more stringent controls on emissions from various sources, including diesel engines and small 2- and 4-cycle engines such as lawnmower, weedeater, chainsaw, and motorcycle engines.

Because of its low manufacturing costs and simplified operating details, the two-cycle engine is favored for small, low-cost engine applications. However, because the exhaust ports remain open for a time after the intake ports are blocked, and due to mixing of the clearance and combustion gases, a finite amount of combustible gases are vented without undergoing any reaction. Analysis of the exhaust indicates that the majority of hydrocarbon emissions are due to direct fuel loss. The bulk of CO emissions arise from incomplete burning of the fuel charge, due to rich operating conditions and low volumetric efficiency. Similar exhaust characteristics occur in side-valve 4-stroke engines.

Because of their operating conditions and minimal maintenance, aftertreatment and engine modifications for two-cycle and side-valve engines must take into account such factors as large load and speed range requirements, heavy vibration, frequent on-off operations, and multipositional operating characteristics. In addition, due to the fuel/oil, mixture ratio required for operation of two-stroke and heavy hydrocarbon emissions in low-cost 4-strokes, any modifications must be insensitive to misfueling, backfiring through the exhaust port, and contaminants in the oil (such as mercaptans containing sulfur, etc.). Also, any engine modifications/converter control options must require minimum or zero maintenance and not introduce any potential safety problems (such as excessive surface or exhaust temperature).

Numerous methods have been utilized in the past to reduce emissions. These emissions control technologies generally fall into two categories: engine modifications and exhaust aftertreatment. The first method utilizes modifications of the engine cycle to achieve more efficient and complete combustion of the fuel and is primarily focused on control of the combustion process. Engine modifications include control of the air/fuel mixture ratio, air/fuel/clearance gas mixing, and combustion process/timing to achieve a more efficient, complete, and uniform combustion process. Exhaust aftertreatment consists of transforming the remaining pollutants into less harmful compounds and can be catalytic or thermal.

A catalyzed exhaust aftertreatment system is the lowest in cost and performance impact and is the most easily implemented emission control option for small two-stroke (and four-stroke) utility engines. Studies have shown this type of system to be capable of reducing emissions to extremely low levels. Aftertreatment utilizes a catalytic surface to enhance the combustion of hydrogen, hydrocarbons, and CO. With the design of the present invention, the catalyst system also traps and combusts organic particulate matter and can be used to raise exhaust gas temperature to allow thermal reactions to complete pollutant conversion.

The major problems in catalytic converters for two-cycle engines arise primarily from the extreme levels of unreacted fuel and CO in two-cycle engine exhaust, which lead to excessive heat release. This heat release, combined with the close proximity to the engine cylinder creates excessive temperatures, which in turn cause degradation of the catalyst/support as well as presenting fire and burn hazards.

Other less obvious but significant problems arise from the high-temperature poisoning effect on the catalyst/catalyst support system, the reduced residence times available (and therefore higher conversion kinetics required) in the small engine vs automotive engine, the presence of sulfur derived from the fuel and lubricating oils, and the substantially increased vibration and impact load durability required in the utility engine as compared to automotive applications.

Typical current generation automotive catalysts consist of a three-way catalyst (composed of a gamma-alumina washcoat impregnated with Pt-Rh catalysts) supported on a through-flow cordierite honeycomb substrate. This cordierite support is not adaptable to the small utility engine due to temperature and reaction kinetic concerns. Another substrate material that has been demonstrated is the use of wire meshes, screens, or expanded metal. However, these systems are too expensive for adaptation to small utility engines since complete converter systems can cost approximately $70–150.

The converter must carry out the following three chemical reactions:

$$CO + \tfrac{1}{2}O_2 \rightarrow CO_2$$

$$C_nH_{(2n+2+)} \tfrac{1}{2}(3n+1)O_2 \rightarrow nCO_2 + (n+1)H_2O$$

$$CO + NO \rightarrow N_2 + CO_2$$

Of these reactions, the reduction of NO to nitrogen is by far the most demanding. However, $NO_x$ reduction is not required to meet 1999 two-cycle emissions standards unless significant engine changes result in an increase in $NO_x$ emissions. The modern autocatalyst is supported on a cordierite honeycomb (cost of $7–14/unit) and comprises a suitable mixture of platinum, rhodium, and palladium metals supported on a thin, high-area alumina "washcoat". A typical automotive catalyst would utilize a 300 cell/in² cordierite monolith with 0.83 g of platinum applied as a ceria/alumina/platinum slurry having a density of 110 g of slurry/g of platinum. Some 60 μm of slurry is applied to the cordierite followed by drying and calcining at 500° C. Approximately 3–5 grams of Pt-group metals are required for each converter.

The two primary difficulties with (The use of an Automotive) a catalyst for two-cycle engines lies in the unsuitability of the washcoat and cordierite substrate to survive the excessive temperatures and thermal transients generated during oxidation of the high-energy exhaust mixture, so the low residence times obtained in such a through-flow geometry and the heavy vibrations encountered in a one-cylinder engine. At full throttle, complete conversion of the small engine exhaust products results in temperatures exceeding 1000° C. At high temperatures, three phenomena take place which "poison" the current catalyst/support materials.

First, at ≈900° C., the gamma-alumina used as a high surface area washcoat transforms into alpha-alumina, having less than 1/500 of the surface area. This condition can be alleviated by starting with an alpha-alumina washcoat, but this washcoat does not provide nearly the surface area of gamma-alumina.

Second, platinum, rhodium, and palladium migrate into the alumina lattice and become ineffective as the lattice is not exposed to the exhaust gases, and this effect is compounded by sintering in both the alumina and metallic phases.

Third, at elevated temperatures mobile species from the support (usually $SiO_2$) can diffuse over the surface of the metal or oxide catalyst, reducing the exposed surface area and poisoning the active surface sites. In addition to catalyst poisoning, cordierite becomes extremely soft at ≈1000° C. and loses most of its mechanical properties, and due to the nature of a small engine develops "hot spots" and localized melting of the support. Substantial grain growth also occurs which leads to thermal "ratcheting" and eventual failure under cyclic operation.

In addition to their temperature limitations, current cordierite honeycomb supports are not available to cell sizes and geometries suitable for two-cycle exhaust systems. To achieve the desired residence times and surface activity in small muffler cans, finer cell sizes and higher strength supports will be required, in an alternate higher thermal conductivity material.

SUMMARY OF THE PRESENT INVENTION

Applicants have demonstrated that a foam support meets the requirements for a small utility engine catalytic converter, by providing both the high conversion efficiency, and temperature stability, mechanical and thermal properties required. Furthermore, this foam support can be manufactured at lower cost (approximately $3–3.50/unit) than either the extruded cordierite material or the metallic supports which are the alternatives.

Due to the temperature poisoning effects, either gas cooling through dilution air insertion (which is difficult to achieve into the interior) or alternate catalyst formulations must be utilized. The present invention includes substrate-independent catalysis using platinum group metal plating of various substrates which are not susceptible to temperature poisoning. A foam support plated with 80 mg of platinum was deemed suitable for exhaust conversion to 1999 levels. Testing of the same system for $O_2/H_2$ catalysis revealed no temperature degradation upon exposure to 1100° C. Other alternatives also modify the catalyst formulations to eliminate highly diffusive species and solubility, such as using a zirconia-based washcoat to provide the required high surface area.

The catalyst system of the present invention has several unique features offering advantages over current autocatalyst formulations. First, utilization of a ceramic or metallic foam substrate, as opposed to a honeycomb structure, provides much greater surface contact and mixing at equivalent or reduced pressure drops and greatly reduced catalyst dimensions. Because of the much higher surface area of foam substrates, it is not necessary to utilize a high surface area washcoat to achieve the desired conversion efficiencies If a higher surface area is desired, surface texturing of the foam surface can provide a 10–100× enhancement in surface area. The present invention provides a 10–100× enhanced catalytic efficiency using foams, mainly due to the greater exposure of catalytic surface to gas (i.e. the catalyst is located solely on the support surface, not imbedded in a washcoat).

The present invention is capable of extended high temperature operation (compared to the gamma alumina wash which undergoes a phase change at roughly 850 C.) and cordierite substrates which are limited to 950° C. The invention also provides for both exhaust conversion and sound suppression in the same unit. In addition, the present invention is capable of surviving high vibration, temperature cycling, high temperature excursion, dirty fuels (oil additives in 2 cycle engines) without degradation in mechanical or chemical (activity) properties, i.e. does not poison readily, and presents high active surface area without excessive pressure drop. The present invention can be cooled to acceptable temperatures or used in conjunction with thermal oxidation for a lower-cost, lower back pressure system.

The core of the system is based on a reticulated foam catalyst support consisting of a non-oxide silicon based compound such as SiC, $Si_3N_4$, or $MoSi_2$. The foam can be fabricated by coating a carbonized polyurethane foam using chemical vapor deposition or infiltration. This foam catalyst support provides high surface area for catalysis as well as sound suppression with low backpressure. To provide catalysis, the reticulated foam support must be coated with an oxidative catalyst consisting of platinum group metals (Pt, Pd, Ir, Rh, or Os). For Nox reduction (not required in small engines) a reducing catalyst is required and must be added. The catalyst can be coated directly onto the foam or for lower temperature operation a washcoat may be used. By coating the foam with a dendritic or porous surface coating using modified fabrication procedures, a significant increase in active surface area can be obtained without affecting backpressure or requiring a separate washcoat.

For lower temperature operation, the foam catalyst support can be activated by using a standard washcoat applied after foam activation (to allow wetting). Activation of the foam can be accomplished via either preoxidation (to provide a thin $SiO_2$ layers or through vapor plating with an oxide (such as $Al_2O_3$, $ZrO_2$, $TiO_2$ or other oxide). However, aqueous plating of the catalyst and washcoat results in unacceptable thermal poisoning characteristics for operation. The present invention eliminates the drawbacks of current state-of-the-art catalyst/support systems and consists of the following specifics:

A catalyst support consisting of an open-cell reticulated, non-oxide foam fabricated by means of chemical vapor deposition or infiltration. The foam support also acts as a bulk acoustic absorber for providing noise reduction A platinum group metal catalyst applied as a thin film which coats the ligament surfaces, applied by organometallic chemical vapor deposition, typically from decomposition of an acetylacetonate compound. The catalyst may also be applied by aqueous plating or fused salt electrolysis, and may utilize a surface preparation technique to control interaction with the non-oxide foam substrate, or to increase foam surface area.

The foam catalyst support/acoustic baffle is fabricated through the following procedure:

1-infiltrate 10–100 ppi polyurethane foam with resin, 2-pyrolize foam/resin to 600–1200 C. to convert to carbons; resulting structure is an open cell porous carbon foam which forms the skeleton for further processing, 2a- during the crosslinking/pyrolization step the foam may be compressed in 1–3 dimensions to form a 150–1000 ppi carbon foam, 3- machining final shape from carbon foam to conform to final catalyst support/sound baffle dimensions (minus further coating dimensional change), 4- using chemical vapor deposition/infiltration (CVD/CVI), coat carbon foam skeleton with surface coating of a metal, SiC, $Si_3N_4$ or $MoSi_2$ to the desired thickness, (governed by strength, heat capacity, etc. requirements); typical final useful densities are from 5–35% metal or ceramic (65–95% open porosity), 5-(optional) activate foam ligament surface through the application of a porous or dendritic coating (Via CVD/CVI), diffusion barrier, or oxide coating (using solgel, CVI, or standard washcoat application); may include surface activation (thermal oxidation), 6- apply/impregnate foam support with surface coating of precious metal catalyst using organometallic CVD, aqueous plating, or fused salt electrolysis, 7- activate catalytic activity (such as 900–1000 C. treatment in $H_2$).

This foam catalyst/baffle structure then forms the basis for a small engine muffler/exhaust system. Using the foam as a baffle material, 10–40 db sound level reduction is obtained with a single baffle with low back pressure, or by lining the acoustic cavity with the foam (zero back pressure). Using two porous foam baffles separated by the proper distance (to provide a certain amount of acoustic resonance) can double the sound suppression level obtained. Modifying the foam geometry to a conical shape (or including conical shaped impressions) allows the same sound suppression levels to be obtained but with reduced backpressure. This type of arrangement is suitable for exhaust sound suppression for a variety of applications (motorcycles, high performance automobiles, chain saws, lawnmowers, weedwackers, etc.), using the foam as a duct-lining can allow noise reduction without affecting back pressure since no flow restriction is developed.

Using the catalyzed foam, emissions levels are simultaneously reduced along with engine noise levels. Again, the ceramic coated carbon foam forms the system core. This coated foam is then further coated with an activation layer and a precious metal catalyst (or combination catalyst). The foam is assembled into a metal can forming the muffler/catalytic converter body. Gas directors may be inserted into the foam to control the exhaust gas path and increase the exhaust gas residence time and a second thermal stage added to increase converter performance. For insulation and packaging (to reduce dimensional tolerance levels, provide for CTE differences and load transfer to survive vibrational loading and provide packing material) a fibrous insulation material (such as Interam™ or metallic felt) is placed between the foam and the metal can. Packing/insulation material can be a woven cloth (such as Siltemp, Nextel, or other oxide fiber insulation) castable or preformed fibrous insulation (such as Kaowool, Min-K, Q-felt, zirconia felt, etc.) Interam™, etch, or a metallic felt. The insulation serves to insulate the ceramic foam support/baffle from the metal can, reducing can temperatures, and reduces the mechanical shock loading of the support/baffle material by acting as a compliant layer between the can and support.

DETAILED DESCRIPTION OF THE INVENTION

Figure 1:
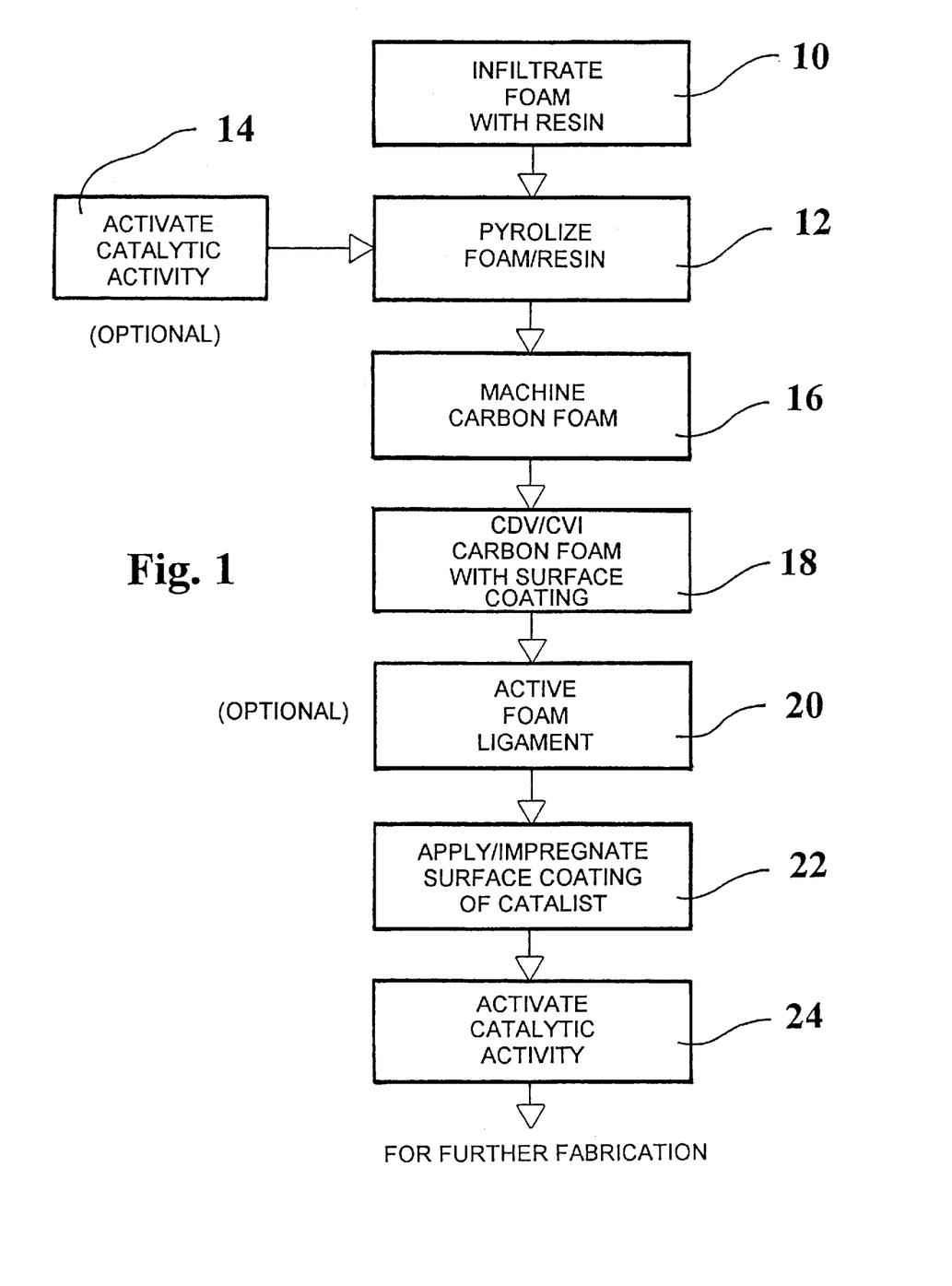
FIG. 1 is a flow chart illustrating the method of forming the foam support material of the present invention.

The foam catalyst support/acoustic baffle material of the present invention is fabricated through the following method as demonstrated by the flow chart shown in FIG. 1. The initial raw material that is used is a 10–100 PPI polyurethane foam. As shown in FIG. 1, this polyurethane foam material is infiltrated with a resin as illustrated by step 10. In the second step 12 of the method, the resin infiltrated foam is pyrolized at a temperature between 600–1200 C. to convert the foam/resin material to carbon. The resulting structure is an open cell porous carbon foam which forms the skeleton for further processing into the resultant catalyst support/acoustic baffle material of the present invention.

As an optional step 14, at the same time the foam/resin is being pyrolized, the foam/resin may be compressed along 1, 2 or 3 directions to form a 150–1000 ppi carbon foam. After the carbon foam skeleton is formed in step 12, the carbon foam may be machined as illustrated in step 16 to conform to the final catalyst support/sound baffle dimensions and with the understanding that there will be further dimensional changes during later coating steps described in FIG. 1.

In step 18, the carbon foam undergoes either carbon vapor deposition or carbon vapor infiltration to coat carbon foam skeleton with a further surface coating. This surface coating may be a metal or other materials such as SiC, $Si_3N_4$ or $MoSi_2$. The desired thickness for the coating will be governed by strength, heat capacity, etc., requirements of the material. As an example, typical final useful density is from 5–35% metal or ceramic which leaves between 65–95% open porosity for the support material.

At this time, an optional step may be provided as illustrated in step 20 and with this optional step being the activation of the foam ligament surface through the application of a porous or dendritic coating, diffusion barrier, or oxide coating. The porous or dendritic coating may be provided by carbon vapor deposition or carbon vapor infiltration. The oxide coating may be provided by various methods such as solgel, CVI, oxidation, or standard washcoat application.

After the activation step 20, or if this step is not used then after the surface coating step 18, an application or impregnation of the foam support with a further surface coating of a catalyst material is illustrated in step 22. Specifically, a surface coating of a precious metal catalyst is provided by such methods such as organometallic CVD, aqueous plating, or fused salt electrolysis. The foam material is now ready for the final step 24 which is the activation of the catalytic surface coating by applying heat such as 900/1000 C. in a hydrogen ($H_2$) environment.

The foam catalyst/baffle structure produced by the method of FIG. 1 forms the basis for the small engine muffler/exhaust system, a number of embodiments of which are shown in FIGS. 2–8. Using two porous foam baffles separated by a proper distance to provide a certain amount of acoustic resonance can double the sound suppression level obtained. Also, the foam geometry can be modified to a conical shape or include conical shape impressions to provide for the same sound suppression levels but with a reduced back pressure.

Other modifications may be the use of gas directors located within the foam to control the exhaust gas path and to increase the exhaust gas residence time. Typically, a fibrous insulation material would be placed between the foam and an outside metal can and this material can be a woven cloth or castable fibrous insulation. All of the embodiments shown in FIGS. 2–8 could include the above insulation and packing material, although this material is not shown in all of the cut away views of FIGS. 2–8.

Figure 2:
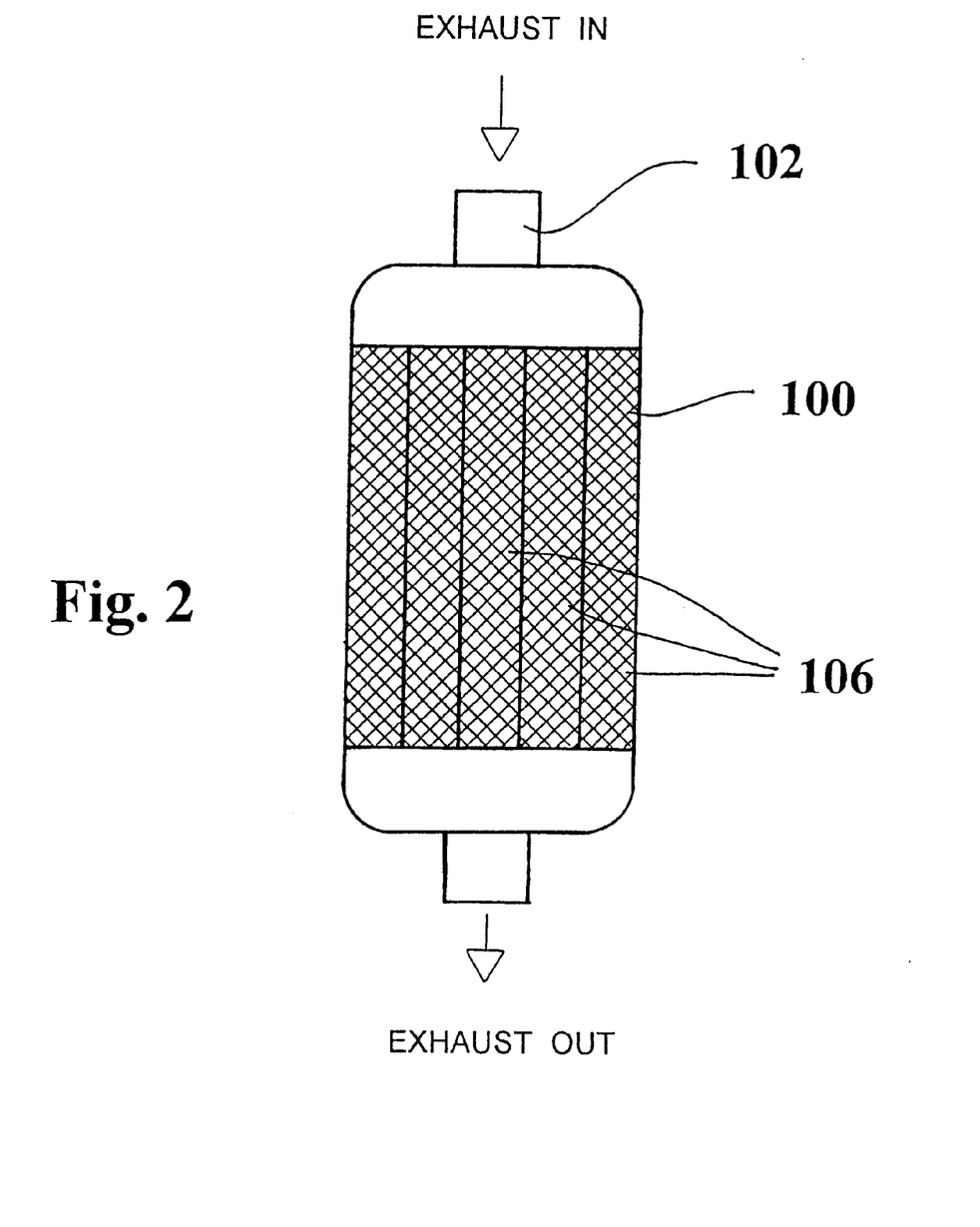
FIG. 2 is a cut away view of a first embodiment of the foam material of the present invention incorporated into an engine muffler/exhaust system.

As shown in FIG. 2, an outer can 100 has an input port 102 to receive the exhaust gas from the motor and an output port 104 to exhaust the now substantially contaminant-free exhaust. As shown in FIG. 2, a plurality of concentric cylinders 106 may be placed within the can 100 and with the input exhaust having to pass through the concentric cylinders. It can be seen that the pathway for the input exhaust is straight through and although the can is shown to be filled with the plurality of concentric cylinders, it is to be appreciated that the foam supported catalyst material may merely be a single mass of such material. In the case of a lind muffler for sound reduction, the foam only needs to be placed in the first ring (201) for maximum performance.

Figure 3:
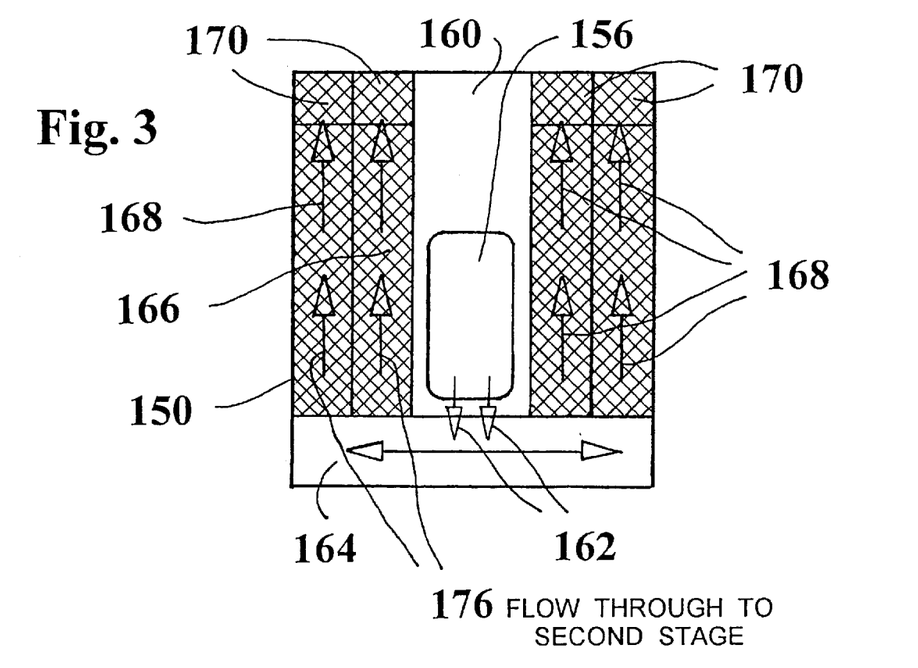
FIG. 3 is a cut away view of a second embodiment of a muffler/exhaust system.
Figure 4:
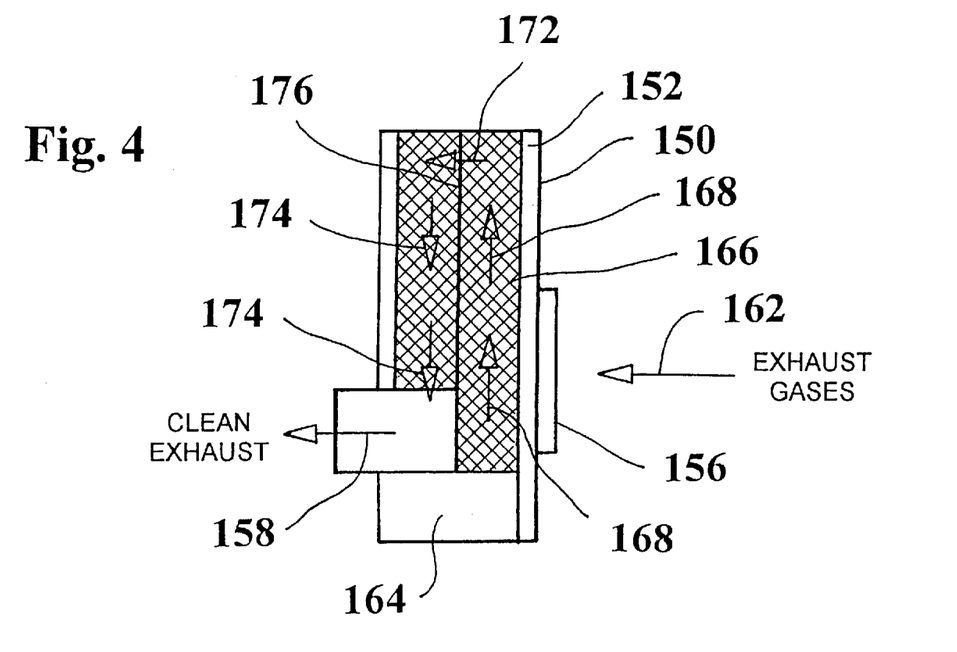
FIG. 4 is a side cut away view of the second embodiment.

FIGS. 3 and 4 show a second embodiment of the catalyzed foam of the present invention incorporated into an engine muffler/exhaust system including an outer can 150. As shown in FIG. 4, insulation and packing material 152 may surround the foam material. In addition, an input port 156 is supplied for exhaust gases and an output port 158 passes the clean exhaust out to the atmosphere. The pathway for the exhaust gases through the muffler/exhaust system is shown by arrows in FIGS. 3 and 4. The exhaust gases pass through the input port 156 into a central area 160 and as shown by arrows 162 pass into an area 164. The exhaust then passes through the catalyzed foam 166 which has been formed into a series of cylindrical members forming first and second stages within the can 150. FIGS. 3 & 4 illustrate the geometric flexibility at the gas path made possible by the foam support.

As shown in FIG. 3, the exhaust gas is passed through the catalyzed foam 166 as shown by arrows 168 to a flow through area 170 at the end of the individual cylindrical sections of foam material 166. Note that in FIG. 4 arrow 172 shows the flow through from the first group or stage of catalyzed foam material into the second group or stage of catalyzed foam material and with the arrow 174 showing the flow through the second stage out to the exhaust port 158. The various flow stages and the divisions between the stages of foam material is provided by flow dividers 176 shown in FIGS. 3 and 4.

Figure 5:
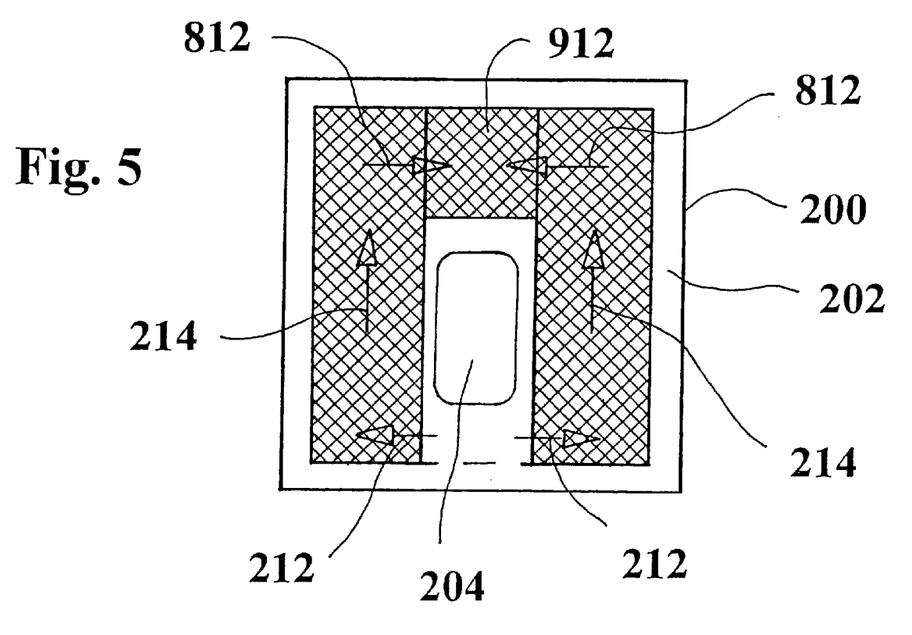
FIG. 5 is a cutaway view of a third embodiment of a muffler/exhaust system.
Figure 6:
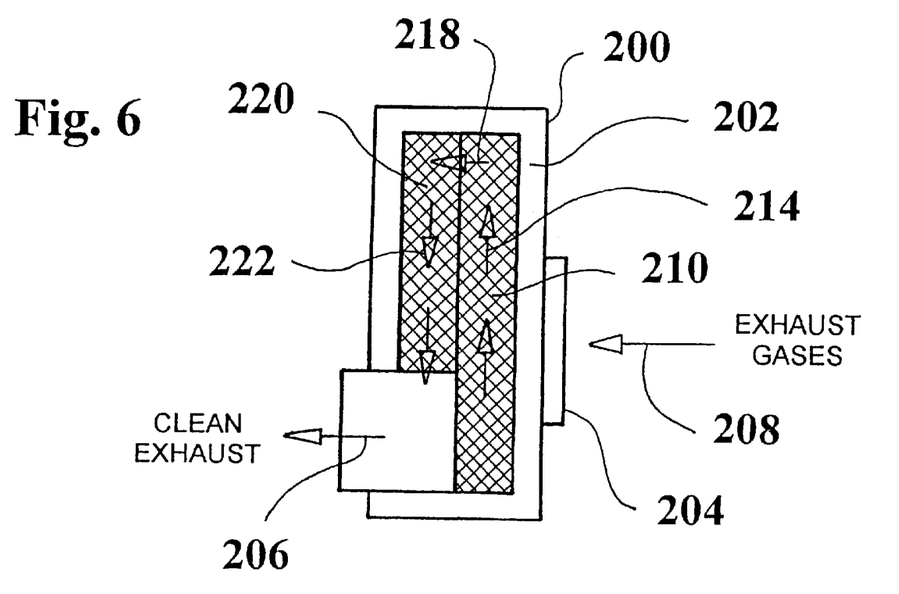
FIG. 6 is a side cutaway view of the third embodiment of FIG. 5.

FIGS. 5 and 6 illustrate a similar muffler/baffle design including an outer can 200 and insulation packing material 202. In addition, input port 204 receives the exhaust gases and port 206 provides the exit for the clean exhaust. The embodiment of FIGS. 5 and 6 has some similarity to that shown in FIGS. 3 and 4 but with a somewhat different arrangement. In the embodiment of FIGS. 5 and 6, the exhaust gases enter the port 204 as shown by arrows 208 and pass through a first stage of catalytic foam 210. The exhaust gases enter the foam as shown by arrows 212 and then proceed in a direction shown by arrows 214 to enter a intermediate section of foam material 216. This is shown by arrows 218. The gases then continue down the second stage of catalytic foam material 220, as shown by arrows 222, to ultimately exit port 206 as clean exhaust.

Figure 7:
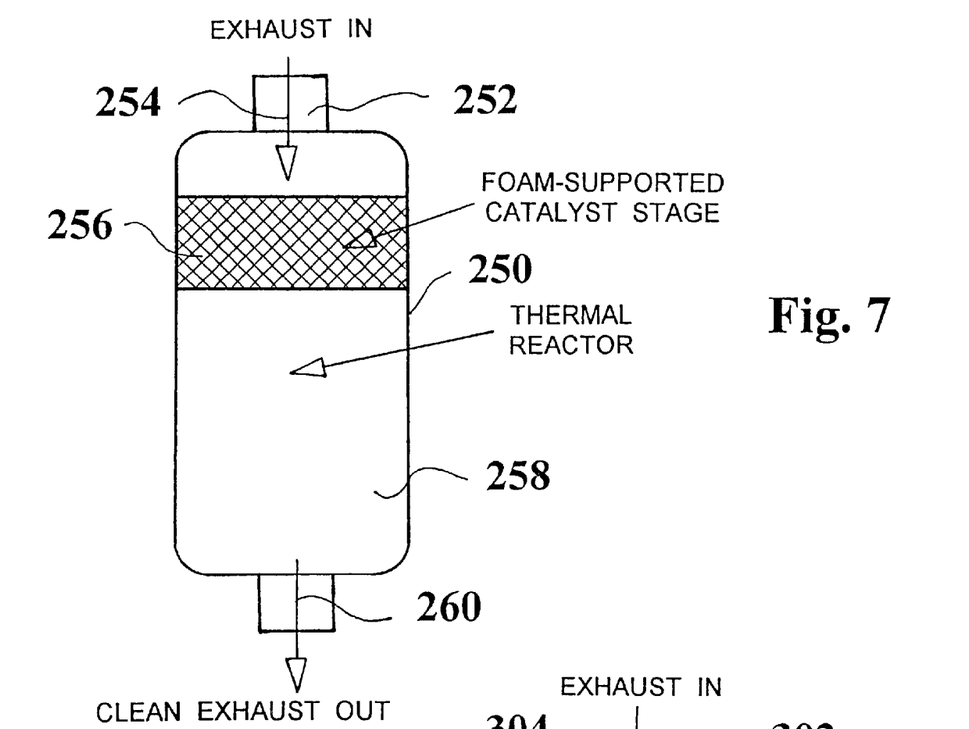
FIG. 7 is a cut away view of a fourth embodiment of a muffler/exhaust system.

FIG. 7 illustrates yet another embodiment of a muffler/exhaust system using the catalyzed foam of the present invention. In the embodiment of FIG. 7, an outer can 250 includes an input port 252 and an exit port 254. Exhaust gases enter the input port 252 as shown by arrow 254 to an interior position within the outer can where catalytic foam material 256 is supported. After the gases pass through the catalytic foam material 256, the gases enter a second portion of the muffler/exhaust structure which forms a thermal reactor 258. After the gases exit the thermal reactor, the clean exhaust now exits the port 254 as shown by arrow 260.

The embodiment of FIG. 7 forms a two-stage catathermal converter. The first stage, which is the catalytic foam material, raises the temperature to increase reaction rates sufficiently for the second stage, which is the thermal reactor, to complete oxidation of hydrocarbons and carbonmonoxide.

Figure 8:
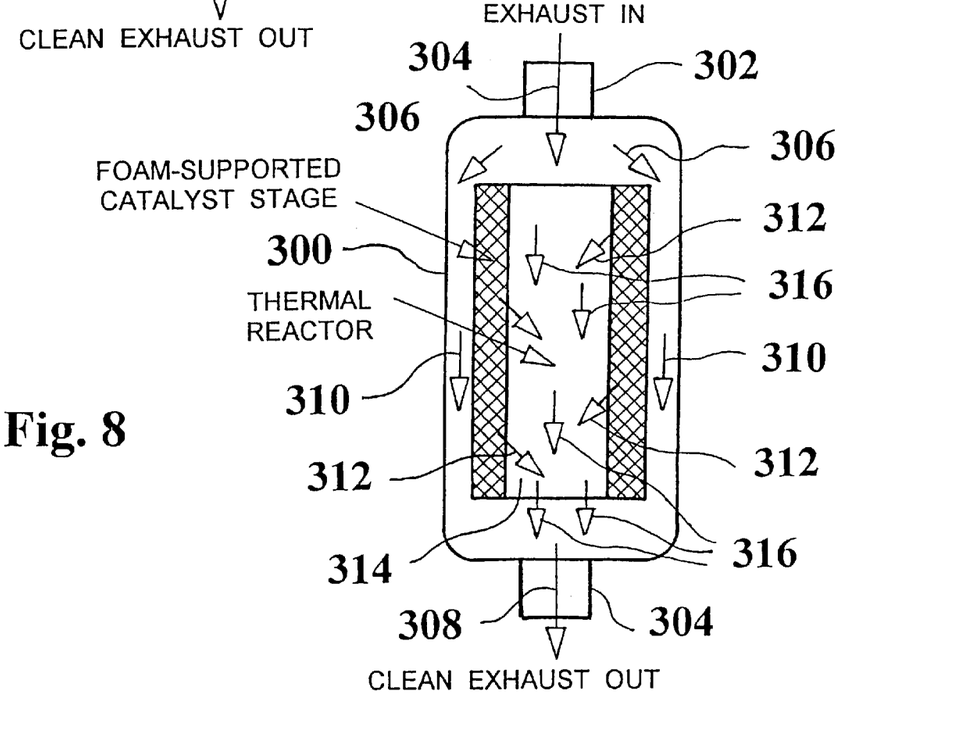
FIG. 8 is a cutaway of a fifth embodiment of a muffler/exhaust system.

FIG. 8 illustrates another embodiment of a catathermal converter design using the foam supported flow through catalyst foam. The embodiment of FIG. 8 provides for concentric flow-through to reduce the thermal and attachment problems that could result from the design of FIG. 7. The embodiment of FIG. 8 produces a minimum flow rate and pressure drop through the catalyst foam material and with the foam catalyst material also insulating the thermal stage from the muffler can. This reduces the amount of catalyst foam required as well as the amount of surface cooling/insulation material necessary.

In the embodiment of FIG. 8, an outer can 300 includes an input port 302 and an exit 304. The input exhaust gases, represented by arrow 304, enter the input port and are diverted in a path as shown by arrows 306 to pass in an area between the can 300 and a concentric tube of catalytic foam material 308. As can be seen in FIG. 8, and as shown by the arrows 310 and 312, the exhaust gases pass downward in the space between the can and the catalytic foam and through the foam into an interior position which forms a thermal reactor 314. The gases are then passed down through the thermal reactor, as shown by arrows 316, to ultimately exit the muffler/baffle exit port 304 as clean exhaust gases represented by arrow 318.

Although this invention has been disclosed and illustrated with reference to particular embodiments, the principles involved are susceptible for use in numerous other embodiments which will be apparent to persons skilled in the art and various adaptations and modifications may be made. The invention is, therefore, only to be limited as indicated by the scope of the appended claims.

We claim:

1. A method of producing an acoustic baffle/catalyst foam support material including the following steps:

providing a polyurethane open cell foam material having a pore density between ten and 100 pores per inch, providing a resin material, infiltrating the polyurethane foam with the resin material to produce an impregnated foam, pyrolizing the impregnated foam to form a carbon foam skeleton, and coating the carbon foam skeleton with one or more of the following group of materials without blocking said pores to produce a coated foam support comprising five to thirty five percent solid compared to sixty five to ninety five percent voids, the group of materials being $SiC$, $Si_3N_4$, $MoSi_2$ or metal which withstands temperatures in excess of 900° C., and applying a catalyst to the coated carbon foam skeleton without blocking said pores, and wherein such catalyst is a metal or metals from the platinum group, and recovering said acoustic baffle/catalyst foam support material, said acoustic baffle/catalyst foam support material having a through-flow configuration.

2. The method of claim 1 wherein the step of coating the carbon foam skeleton is provided using either chemical vapor deposition or chemical vapor infiltration.

3. The method of claim 1 include an additional step of geometrically compressing the infiltrated foam in one, two or three dimensions to form foam having a pore density between 150–1000 ppi.

4. The method of claim 1 including the additional step of activating the coated carbon foam skeleton for enhancement of the surface coating.

5. The method of claim 4 wherein the step of activation is provided by a chemical vapor deposition of a dendritic surface coating.

6. The method of claim 4 wherein the step of activation is provided by a deposition of a porous surface structure.

7. The method of claim 4 wherein the step of activation is provided by an application of an oxide surface layer.

8. The method of claim 7 where the application of the oxide surface layer is provided by chemical vapor deposition.

9. The method of claim 7 wherein the application of the oxide surface layer is applied by thermal oxidation.

10. The method of claim 1 wherein the step of applying the catalyst is provided by using chemical vapor deposition or chemical vapor infiltration from an organometallic compound.

11. The method of claim 1 wherein the step of applying the catalyst is provided using aqueous plating.

12. The method of claim 1 wherein the step of applying the catalyst is provided using fused salt electrolysis.

13. The method of claim 1 wherein the step of providing the catalyst is provided as a thin contiguous coating.

14. The method of claim 1 including an additional step of activating the catalyst material.

15. The method of claim 14 wherein the step of activating catalyst material is provided by the treatment of the coated foam material at 900–1000° C. in $H_2$.

16. An acoustic baffle/catalyst support including:
   an open cell carbon foam skeleton,
   a surface coating on the carbon foam skeleton forming a support comprising five to thirty five percent solid compared to sixty five to ninety five percent voids,
   wherein the surface coating is formed by one or more of the following group of materials SiC, $Si_3N_4$, $MoSi_2$ or metal which withstands temperatures in excess of 900° C., and
   a catalytic layer on the surface coating and wherein such catalytic layer is formed from a platinum group metal or metals, said acoustic baffle/catalyst support having opposed sides and being adapted to permit fluid to flow through said voids from one of said opposed sides to the other.

17. The acoustic baffle/catalyst support of claim 16 wherein a dendritic coating is on the surface coating.

18. The acoustic baffle/catalyst support of claim 16 wherein a porous surface structure is on the surface coating.

19. The acoustic baffle/catalyst support of claim 16 wherein a oxide surface layer is on the surface coating.

20. The acoustic baffle/catalyst support of claim 16 wherein a diffusion barrier is on the carbon foam skeleton.

21. The acoustic baffle/catalyst support of claim 16 wherein the catalyst layer is formed as a thin contiguous coating.

22. The acoustic baffle/catalyst support of claim 16 wherein an outer can having an input and output port and a pathway between the input and output ports is provided and wherein the support is positioned within the pathway to form an engine muffler/exhaust.

23. The acoustic baffle/catalyst support of claim 22 wherein the support is formed as a cylindrical section within the pathway in the outer can.

24. The acoustic baffle/catalyst support of claim 23 wherein the support is formed as multiple cylindrical sections positioned within the pathway.

25. The acoustic baffle/catalyst support of claim 22 wherein a plurality of sections of support are included within the outer can and with additional flow dividers located within the can and between individual sections of support to provide for a folded pathway within the outer can through the multiple sections of support from the input to the output port.

26. The acoustic baffle/catalyst support of claim 22 wherein a thermal reactor is located within the can between the support and the exit port.

27. The acoustic baffle/catalyst support of claim 22 wherein a compliant packing material is located between the container and the support.

28. The acoustic baffle/catalyst support of claim 22 wherein an insulator surrounds the support.

29. The acoustic baffle/catalyst support of claim 28 wherein a dense, non-abrading interlayer is located between the insulator and the support.

* * * * *